US008236271B2

(12) United States Patent
Dupeyrat-Batiot et al.

(10) Patent No.: US 8,236,271 B2
(45) Date of Patent: Aug. 7, 2012

(54) PROCESS FOR PRODUCING HYDROGEN GAS AND CARBON NANOTUBES FROM CATALYTIC DECOMPOSITION OF ETHANOL

(75) Inventors: Catherine Dupeyrat-Batiot, Sèvres-Anxaumont (FR); Jean-Michel Tatibouet, Poitiers (FR); Joël Barrault, Ligugé (FR); Fanor Mondragon-Pérez, Medellin (CO); Jaime Andres Gallego Marin, Medellin (CO); German-Alberto Sierra Gallego, Medillin (CO)

(73) Assignees: Centre National de la Recherche Scientifique, Paris Cedex (FR); Universite de Poitiers, Poitier Cedex (FR); University of Antioquia, Medellin (CO)

( * ) Notice: Subject to any disclaimer, the term of this patent is extended or adjusted under 35 U.S.C. 154(b) by 0 days.

(21) Appl. No.: 12/667,194

(22) PCT Filed: Jul. 2, 2008

(86) PCT No.: PCT/IB2008/001733
§ 371 (c)(1),
(2), (4) Date: Mar. 10, 2010

(87) PCT Pub. No.: WO2009/004462
PCT Pub. Date: Jan. 8, 2009

(65) Prior Publication Data
US 2010/0215568 A1    Aug. 26, 2010

(30) Foreign Application Priority Data

Jul. 2, 2007    (EP) .................................... 07290833

(51) Int. Cl.
*D01F 9/12*    (2006.01)
(52) U.S. Cl. ..................................... 423/447.3; 977/843
(58) Field of Classification Search ............... 423/447.3, 423/447.1, 447.2, 445 B; 977/742–754, 977/842–848; 428/367
See application file for complete search history.

(56) References Cited

U.S. PATENT DOCUMENTS

| 3,330,697 A | 7/1967 | Pechini |
| 5,114,702 A | 5/1992 | Pederson et al. |
| 6,315,977 B1 | 11/2001 | Cantacuzene |
| 6,387,554 B1 | 5/2002 | Verykios |
| 6,605,376 B2 | 8/2003 | Verykios |
| 2003/0129122 A1 | 7/2003 | Chen et al. |
| 2004/0005269 A1* | 1/2004 | Huang et al. ............... 423/447.3 |
| 2005/0074392 A1* | 4/2005 | Yang et al. ................. 423/447.3 |

OTHER PUBLICATIONS

Maruyama, et al., Low-temperature synthesis of high-purity single-walled carbon nanotubes from alcohol, Chemical Physics Letters 2002; 360: 229-234.*

(Continued)

*Primary Examiner* — Daniel C. McCracken
(74) *Attorney, Agent, or Firm* — Arent Fox LLP

(57) ABSTRACT

The present invention relates to a process for the production of hydrogen gas and carbon nanotubes from catalytic decomposition of ethanol. More particularly, the invention relates to a process for preparing hydrogen gas and carbon nanotubes from catalytic decomposition of bioethanol over $Ni/La_2O_3$ catalyst is obtainable by $H_2$ reduction of a $LaNiO_3$ perovskite catalyst precursor. Additionally, the present invention relates to the use of a $Ni/La_2O_3$ catalyst obtainable by $H_2$ reduction of a $LaNiO_3$ perovskite catalyst precursor in the manufacture of hydrogen gas and carbon nanotubes from gaseous ethanol.

11 Claims, 4 Drawing Sheets

OTHER PUBLICATIONS

Planeix et al., "Application of Carbon Nanotubes as Supports in Heterogeneous Catalysis" J. Am. Chem. Soc., 1994, pp. 7935-7936, 1994 American Chemical Society.

P.M. Ajayan et al., "Opening Carbon Nanotubes with Oxygen and Implications for Filing", Letters to Nature, Apr. 8, 1993, pp. 522-525, vol. 362.

M.M.J. Treacy et al., "Exceptionally High Young's Modulus Observed for Individual Carbon Nanotubes", Letters to Nature, Jun. 20, 1996, pp. 678-680, vol. 381.

Sumio Iijima, "Helical Microtubules of Graphitic Carbon", Letters to Nature, Nov. 7, 1991, pp. 56-58, vol. 354.

Yahachi Saito et al., "Extrusion of Single-Wall Carbon Nanotubes Via Formation of Small Particles Condensed Near an Arc Evaporation Source", Chemical Physics Letters 236, Apr. 12, 1995, pp. 419-426, 1995 Elsevier Science B.V.

N. Z. Muradov, "How to Produce Hydrogen From Fossil Fuels Without $CO_2$ Emission", Int. J. Hydrogen Energy, 1993, pp. 211-215, vol. 18, No. 3, 1993 International Association for Hydrogen Energy.

Tatsumi Ishihara et al., "Decomposition of Methane Over $Ni/SiO_2$ Catalysts with Membrane Reactor for the Production of Hydrogen", Chemistry Letters 1995, pp. 93-94.

Thomas Rostrup-Nielsen, "Manufacture of Hydrogen", Catalysis Today 106, 2005, pp. 293-296, 2005 Elsevier B.V.

Luca Basini, "Issues in $H_2$ and Synthesis Gas Technologies for Refinery, GTL and Small and Distributed Industrial Need", Catalysis Today 106, 2005, pp. 34-40.

Athanasios N. Fatsikostas et al., "Steam Reforming of Biomass-Derived Ethanol for the Production of Hydrogen for Fuel Cell Applications", Chemcomm Communication, 2001, pp. 851-852.

Catherine Batiot-Dupeyrat[a] et al., Pulse Study of $CO_2$ Reforming of Methane Over $LaNiO_{3}$", 2003, pp. 143-151, 2003 Elsevier B.V.

Catherine Batiot-Dupeyrat[a], et al., "$CO_2$ Reforming of Methane Over $LaNiO_3$ as Precursor Material", Catalysis Today 107-108, 2005, pp. 474-480, 2005 Elsevier B.V.

Germán Sierra Gallego, "$CO_2$ Reforming of $CH_4$ Over La-Ni Based Perovskite Precursors", Applied Catalysis A: General 311, 2006, pp. 164-171, 2006 Elsevier B.V.

A. Slagtern et al., "Specific Features Concerning the Mechanism of Methane Reforming by Carbon Dioxide Over $Ni/La_2O_3$", Journal of Catalysis 172, 1997, pp. 118-126, 1997 by Academic Press.

V.A. Tsipouriari et al., "Carbon and Oxygen Reaction Pathways of $CO_2$ Reforming of Methane over $Ni/La_2O_3$ Catalysts Studied by Isotopic Tracing Techniques", Journal of Catalysis 187, 1999, pp. 85-94, 1999 by Academic Press.

H. Provendier et al., Dry Reforming of Methane. Interest of La-Ni-Fe Solid Solutions Compared to $LaNiO_3$ and $LaFeO_3$, Natural Gas Conversion 119, 1998, pp. 741-746.

\* cited by examiner

PROCESS FOR PRODUCING HYDROGEN GAS AND CARBON NANOTUBES FROM CATALYTIC DECOMPOSITION OF ETHANOL

CROSS-REFERENCED TO RELATED APPLICATION

This application is a National Stage entry of International Application No. PCT/IB2008/001733, filed Jul. 2, 2008, which claims priority to European Patent Application No. 07290833.8, filed Jul. 2, 2007, the disclosure of the prior application is incorporated in its entirety by reference.

FIELD OF THE INVENTION

The present invention relates to a process for the production of hydrogen gas and carbon nanotubes from catalytic decomposition of ethanol. More particularly, the invention relates to a process for preparing hydrogen gas and carbon nanotubes from catalytic decomposition of ethanol or bioethanol over a Ni/La$_2$O$_3$ catalyst that is obtainable by H$_2$ reduction of a LaNiO$_3$ perovskite catalyst precursor.

In the description below, numbers in brackets ([ ]) refer to the list of references presented after the Examples.

BACKGROUND OF THE INVENTION

The discovery of carbon nanotubes triggered a worldwide research effort devoted to determining their structure, calculating and measuring their physical properties, and to improving methods of production. Carbon nanotubes have many extraordinary physical and chemical properties, which has prompted their widespread use in many applications.

For example, they can be used as supports for metal catalysts.[1] As tubular structures, they have unusual capillary properties.[2] Mechanically, nanotubes are significantly stiffer than currently commercially available carbon fibers, and can therefore be used to strengthen composite materials or atomic force microscope tips.[3] Filled with metals or semiconductors, nanotubes may well provide components for nanoscale electrical or electronic devices such as amplifiers, switches or electrical-mechanical converters.

Three technologies have been used for the synthesis of carbon nanotubes: carbon-arc discharge, laser-ablation and catalytic decomposition processes.

In the carbon arc-discharge method, carbon nanotubes are grown in an inert gas atmosphere between carbon electrodes between which an electric arc is generated. The anode electrode is consumed to form a plasma, the temperature of which can reach 6000° C.[4]

The laser-ablation technique consists in exposing a graphite target to a pulsed or continuous high-energy laser beam. The graphite is either vaporized or fragmented into aggregates of a few atoms.[5]

The carbon-arc discharge and laser-ablation methods require highly technical equipment, and are quite expensive. As such, they were designed primarily for carbon nanotubes synthesis on a laboratory scale and were used primarily for theoretical investigation. They are not suitable for the large-scale production of carbon nanotubes.

The third technology that was implemented to make carbon nanotubes is catalytic decomposition of hydrocarbons or oxygen containing compounds in the presence of supported transition metal catalysts. This method is more amenable to industrial scale applications. However, current methods suffer the disadvantage that they use non-renewable fuels such as methane or hydrocarbons. The most widely studied method is catalytic decomposition of methane primarily on iron oxide,[6] but also on Ni/SiO$_2$.[7]

Hydrogen gas is also a material of great industrial interest. It is being used primarily in processes for the desulphurization and/or hydrogenation of aromatic derivatives produced in oil refinery plants. It is also used in mixtures with carbon monoxide and nitrogen gas in the synthesis of methanol, ammonia and liquid hydrocarbon products (Fischer-Tropsch reactions).

The utilization of hydrogen gas for fuel-cell type applications is considered to be one of the most promising leads to answer the energy needs of the future[8]

So far, 96% of the hydrogen gas that is produced today originates from reforming of natural gas, primarily methane, (76%) and of light naphtha (20%). 4% of the production of hydrogen gas comes from partial oxidation of oil or petroleum residues.[9]

The reforming reaction is generally carried out at high temperature (400-700° C.) in the presence of an alumina supported Nickel catalyst. Generally, the reforming reaction is followed by a reaction in the presence of water (gas-to-water reaction) so as to oxidize carbon monoxide to carbon dioxide.

However, the main drawback associated with the production of hydrogen gas through reforming methane is that the process produces carbon dioxide. Likewise, current technologies for the production of carbon nanotubes utilize non-renewable fuels, such as natural gas or hydrocarbons. Therefore, the primary processes for producing hydrogen gas and carbon nanotubes currently used are not environmentally friendly.

Therefore, there remains a need to develop new processes for producing hydrogen gas and carbon nanotubes from renewable fuels, and without emission of pollutants that are harmful to the environment.

DESCRIPTION OF THE INVENTION

The present invention answers many of the aforementioned limitations. Namely, the invention provides a new process for the production of two materials of high industrial interest (carbon nanotubes and hydrogen gas) from a renewable hydrocarbon source (ethanol), without emission of substances harmful to the environment, with a higher yield and efficiency than processes currently known in the art.

Processes have been reported that involve the catalytic decomposition of methane to produce carbon nanotubes and hydrogen gas.[10] Another process for the production of hydrogen gas has also been reported, which involves the thermocatalytic decomposition of a hydrocarbon.[11] However, once again these processes involve the utilization of non-renewable fuels.

Applicants are the first to report a process allowing the simultaneous production of hydrogen gas and carbon nanotubes, based on catalytic decomposition of ethanol, a renewable energy source.

The inventive process involves the use of a of a Ni/La$_2$O$_3$ catalyst obtainable by H$_2$ reduction of a LaNiO$_3$ perovskite catalyst precursor. That catalyst is characterized in the presence of small particles of Nickel, which favors the formation of carbon nanotubes.

The formation of hydrogen gas and carbon nanotubes according to the process of the invention proceeds according to the following reaction:

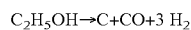

The process is of great interest since the production of hydrogen proceeds with concurrent sequestration of half of the carbon content of ethanol in the form of carbon nanotubes. The carbon monoxide that is produced in the process of the invention is also a reaction intermediate of great industrial interest.

The ethanol used in the process can be obtained from fermentation of biomass—It is then referred to as bioethanol, a renewable energy source. Bioethanol is produced in large quantity from sugar cane in Brazil, and from corn kennels kernels in the United States. The massive use of bioethanol on an industrial scale would therefore contribute to worldwide efforts to reduce the production of greenhouse gases.

Thus, in one aspect, the present invention relates to a process for producing hydrogen gas and carbon nanotubes comprising contacting gaseous ethanol with a $Ni/La_2O_3$ catalyst such that hydrogen gas and carbon nanotubes are produced concurrently with carbon monoxide, wherein the $Ni/La_2O_3$ catalyst is obtainable by $H_2$ reduction of a $LaNiO_3$ perovskite catalyst precursor.

Feedstock—Gaseous Ethanol

In certain embodiments, the process may be carried out with pure ethanol, or ethanol having a relatively low water content. In certain exemplary embodiments, the ethanol to be decomposed by the process of the invention contains less than 1%, less than 2%, less than 3%, less than 5%, less than 10%, less than 15%, less than 20%, less than 25%, less than 30% w/w water.

In certain embodiments, the ethanol is bio-ethanol, that is ethanol obtained from fermentation of biomass.

The use of biomass as a renewable energy source has been the subject of extensive investigation and research efforts for many years. Three different means of use of biomass as energy source have been applied internationally: combustion, pyrolysis for the production of gaseous and liquid fuels, and fermentation for the production of ethanol. Sources of biomass can be plants which have certain specific characteristics and which are grown for this purpose, or waste materials from cultivation of edible products or from agro industries or from forestry. Studies, which have been conducted in recent years, show that there are significant quantities and sources of biomass which can be utilized for the production of energy.

The production of ethanol from biomass which is often referred to in the bibliography as "bio-ethanol", is known and is practiced in large scale, mostly in North and South America and in Europe. Biomass processes for the production of ethanol can be classified in two large categories: those which utilize sugar-containing raw materials—products of energetic cultivations (for example sweet sorghum) and those which utilize cellulosic raw materials originating from energetic cultivations (sorghum, cane, solid residue of sweet sorghum, etc.) as well as from residues of agro industries. In the first case, sugars are directly fermented for the production of ethanol, while in the second case a hydrolysis step, or other processes, are carried out to produce sugars, which are then converted to ethanol via fermentation.

The main sources of sugar required to produce ethanol come from fuel or energy crops. These crops are grown specifically for energy use and include corn, maize and wheat crops, waste straw, willow and popular trees, sawdust, reed canary grass, cord grasses, jerusalem artichoke, myscanthus and sorghum plants. There is also ongoing research and development into the use of municipal solid wastes to produce ethanol fuel.

As discussed above, bioethanol can be produced from biomass by processes of hydrolysis and sugar fermentation. Biomass wastes contain a complex mixture of carbohydrate polymers from the plant cell walls known as cellulose, hemi cellulose and lignin. In order to produce sugars from the biomass, the biomass is pre-treated with acids or enzymes in order to reduce the size of the feedstock and to open up the plant structure. The cellulose and the hemi cellulose portions are broken down (hydrolyzed) by enzymes or dilute acids into sucrose sugar that is then fermented into ethanol. The lignin which is also present in the biomass is normally used as a fuel for the ethanol production plants boilers. There are three principle methods of extracting sugars from biomass: concentrated acid hydrolysis (Arkanol process), dilute acid hydrolysis and enzymatic hydrolysis. Bioethanol may also be obtained from the wet milling processes or dry milling process of corn kernels.

Bioethanol, which is produced by the fermentation route, generally contains a significant quantity of water. In certain embodiments, the bioethanol may be subjected to a purification step to decrease its contents in water to the desired level. For example, a fractional distillation process may be used. The distillation process works by boiling the water and ethanol mixture. Since ethanol has a lower boiling point (78.3° C.) compared to that of water (100° C.), the ethanol turns into the vapor state before the water and can be condensed and separated.

In certain other embodiments, the ethanol is introduced in an area of the reactor that is heated such that ethanol goes into a gaseous state. In certain embodiments, the reactor area in which the ethanol is introduced is heated at a temperature above the boiling point of ethanol. In certain exemplary embodiments, the reactor area is heated at a temperature ranging between 100° C. and 500° C.; between 100° C. and 400° C.; between 100° C. and 300° C.; between 150° C. and 250° C. In certain exemplary embodiments, the reactor area in which the ethanol is introduced is heated at a temperature of about 200° C.

In certain embodiments, ethanol is being introduced at a suitable flow rate so as to allow efficient transition of the ethanol into gaseous state. In certain exemplary embodiments, ethanol is being introduced at a liquid flow rate ranging between 0.01 mL/min and 1.0 mL/min, between 0.01 mL/min and 0.8 mL/min, between 0.01 mL/min and 0.6 mL/min, between 0.01 mL/min and 0.4 mL/min, between 0.01 mL/min and 0.3 mL/min, between 0.01 mL/min and 0.2 mL/min, between 0.01 mL/min and 0.1 mL/min. In certain other exemplary embodiments, ethanol is being introduced at a liquid flow rate of about 0.05 mL/min.

In certain other embodiments, an inert gas flow is used to carry the gaseous ethanol into the reactor, more particularly into the reactor chamber where the catalyst bed is located. The inert gas can be any suitable inert gas known in the art. In certain embodiments, the inert gas is nitrogen gas.

In certain embodiments, the gaseous ethanol is mixed with the carrier inert gas in a ratio ethanol/carrier gas ranging from 20/80 to 80/20 by volume, from 25/75 to 75/25 by volume, from 30/70 to 70/30 by volume, from 35/65 to 65/35 by volume, from 40/60 to 60/40 by volume, from 45/55 to 55/45 by volume. In certain embodiments, the gaseous ethanol is mixed with the carrier inert gas in a ratio ethanol/carrier gas of about 50/50 by volume. In certain other exemplary embodiments, the gaseous ethanol is mixed with nitrogen gas as the carrier inert gas in a ratio ethanol/$N_2$ of about 50/50 by volume.

In certain exemplary embodiments, gaseous ethanol is being carried into the reactor by the inert gas at a flow rate ranging between 5.0 mL/min and 50.0 mL/min, between 5.0 mL/min and 40.0 mL/min, between 5.0 mL/min and 30.0 mL/min, between 10.0 mL/min and 30.0 mL/min. In certain other exemplary embodiments, gaseous ethanol is being carried into the reactor by the inert gas at a flow rate of about 20.0 mL/min. In certain other exemplary embodiments, the inert gas is $N_2$, and the gaseous ethanol is being carried into the reactor by $N_2$ at a flow rate of about 20.0 mL/min.

In certain embodiments, gaseous ethanol is carried by the inert gas flow into the reactor so that the contact time between gaseous ethanol and the catalyst is between 0.03 g.s.cm$^{-3}$ and 0.60 g.s.cm$^{-3}$, between 0.03 g.s.cm$^{-3}$ and 0.50 g.s.cm$^{-3}$, between 0.03 g.s.cm$^{-3}$ and 0.40 g.s.cm$^{-3}$, between 0.03 g.s.cm$^{-3}$ and 0.30 g.s.cm$^{-3}$, between 0.03 g.s.cm$^{-3}$ and 0.20 g.s.cm$^{-3}$, between 0.03 g.s.cm$^{-3}$ and 0.10 g.s.cm$^{-3}$, between 0.03 g.s.cm$^{-3}$ and 0.09 g.s.cm$^{-3}$, between 0.03 g.s.cm$^{-3}$ and 0.08 g.s.cm$^{-3}$.

In certain other exemplary embodiments, gaseous ethanol is carried by the inert gas flow into the reactor so that the contact time between gaseous ethanol and the catalyst is about 0.075 g.s.cm$^{-3}$. In certain other exemplary embodiments, the inert gas is $N_2$, and the gaseous ethanol is carried by $N_2$ flow into the reactor so that the contact time between gaseous ethanol and the catalyst is about 0.075 g.s.cm$^{-3}$.

In certain embodiments, the process of the invention is conducted at a temperature ranging from 300° C. to 900° C. In certain other embodiments, the process is conducted at a temperature ranging from 300° C. to 500° C. Within that temperature range, the ethanol does not undergo thermal decomposition. Accordingly, at that temperature, the ethanol is catalytically decomposed into hydrogen gas, carbon nanotubes and carbon monoxide. In certain exemplary embodiments, the process is conducted at a temperature ranging from 325° C. to 500° C.; from 350° C. to 500° C.; from 375° C. to 500° C.; from 400° C. to 500° C.; from 425° C. to 500° C.; from 450° C. to 500° C.; from 475° C. to 500° C. In certain other exemplary embodiments, the process is conducted at about 500° C.

Ethanol is thermally stable up to 500° C. Beyond that temperature, ethanol undergoes thermal decomposition. A graph showing the decomposition of ethanol as a function of temperature is illustrated in FIG. 2. In particular, beyond 500° C., ethanol is transformed into hydrogen gas, methane, carbon dioxide and/or carbon monoxide according to the following reactions:

$$2\ C_2H_5OH \rightarrow 3\ CH_4 + CO_2 \quad \text{(Reaction 1)}$$

$$C_2H_5OH \rightarrow CH_4 + CO + H_2 \quad \text{(Reaction 2)}$$

As seen in FIG. 2, thermal decomposition of ethanol is nearly complete at 700° C. Thus between 500° C. and 700° C., thermal decomposition of ethanol competes with the catalytic decomposition process described above. Nevertheless, even when the process is conducted at temperatures leading to thermal decomposition of ethanol, hydrogen gas and carbon nanotubes can be produced.

Thus, hydrogen gas can be produced either directly, through reaction 2 above, or indirectly through reaction 3 below, where the source of methane and carbon dioxide is reaction 1 above:

$$CH_4 + CO_2 \rightarrow 2\ CO + 2\ H_2 \quad \text{(Reaction 3)}$$

Reaction 3 is also referred to as <<$CO_2$ reforming of methane.>>

On the other hand, carbon nanotubes can be produced by the reaction of cracking of methane over the Ni/La$_2$O$_3$ catalyst, according to reaction 4 below:

$$CH_4 \rightarrow C + 2\ H_2 \quad \text{(Reaction 4)}$$

In certain embodiments, the process is conducted at a temperature above 500° C. (>500° C.), particularly between >500° C. and 900° C.

In certain embodiments, the process is conducted at a temperature above 700° C. (>700° C.), particularly between >700° C. and 900° C. In that temperature range, thermal decomposition of ethanol supplants the catalytic decomposition of ethanol.

Accordingly, when the process is conducted at a temperature above 700° C. (>700° C.), particularly between >700° C. and 900° C., hydrogen gas and carbon nanotubes are produced nearly exclusively through reactions 2, 3 and 4 above. Thus, in certain embodiments, the process of the invention is conducted at a temperature ranging from 700° C. to 900° C., and ethanol undergoes thermal decomposition into $CH_4$ and $CO_2$, and/or CO and $H_2$, wherein
 a. the hydrogen gas according to the process is obtained from direct thermal decomposition of ethanol and/or from $CO_2$ reforming of $CH_4$, where $CH_4$ and $CO_2$ are thermal decomposition products of ethanol; and
 b. carbon nanotubes are obtained from catalytic cracking of $CH_4$ over the Ni/La$_2$O$_3$ catalyst.

In certain embodiments, the process of the invention is carried out at temperatures ranging from 300° C. to 500° C., and the amount of carbon nanotubes obtained is equal to or greater than 15 g per gram of catalyst, preferably between 15 and 20 g of carbon nanotubes per gram of catalyst. In certain embodiments, the process of the invention is carried out at temperatures ranging from 300° C. to 500° C., gaseous ethanol is carried by the inert gas flow into the reactor so that the contact time between gaseous ethanol and the catalyst is between 0.03 g.s.cm$^{-3}$ and 0.08 g.s.cm$^{-3}$. and the amount of carbon nanotubes obtained is equal to or greater than 15 g per gram of catalyst.

In certain embodiments, the process of the invention is carried out at temperatures ranging from 300° C. to 500° C., and the production of hydrogen gas is equal to or greater than 17 L/h $H_2$ per gram of catalyst, preferably between 19 and 40 L/h $H_2$ per gram of catalyst. In certain embodiments, the process of the invention is carried out at temperatures ranging from 300° C. to 500° C., gaseous ethanol is carried by the inert gas flow into the reactor so that the contact time between gaseous ethanol and the catalyst is between 0.03 g.s.cm$^{-3}$ and 0.08 g.s.cm$^{-3}$. and the production of hydrogen gas is equal to or greater than 17 L/h $H_2$ per gram of catalyst, preferably between 19 and 40 L/h $H_2$ per gram of catalyst.

In certain embodiments, the process of the invention is carried out at temperatures above 500° C., particularly between above 500° C. and 900° C., and the amount of carbon nanotubes obtained is equal to or greater than 6 g per gram of catalyst are obtained, preferably between 6 and 20 g of carbon nanotubes per gram of catalyst. In certain embodiments, the process of the invention is carried out at temperatures above 500° C., particularly between above 500° C. and 900° C., gaseous ethanol is carried by the inert gas flow into the reactor so that the contact time between gaseous ethanol and the catalyst is between 0.03 g.s.cm$^{-3}$ and 0.08 g.s.cm$^{-3}$. and the amount of carbon nanotubes obtained is equal to or greater than 6 g per gram of catalyst are obtained, preferably between 6 and 20 g of carbon nanotubes per gram of catalyst.

In certain embodiments, the process of the invention is carried out at temperatures above 500° C., particularly between above 500° C. and 900° C., and the production of hydrogen gas is equal to or greater than 10 L/h $H_2$ per gram of catalyst, preferably between 10 and 50 L/h $H_2$ per gram of catalyst. In certain embodiments, the process of the invention is carried out at temperatures above 500° C., particularly between above 500° C. and 900° C., gaseous ethanol is carried by the inert gas flow into the reactor so that the contact time between gaseous ethanol and the catalyst is between 0.03 g.s.cm$^{-3}$ and 0.08 g.s.cm$^{-3}$. and the production of hydrogen gas is equal to or greater than 10 L/h H$_2$ per gram of catalyst, preferably between 10 and 50 L/h H$_2$ per gram of catalyst.

It will be appreciated that the quantity of carbon nanotubes and hydrogen gas produced by the process depends from the flow rate at which ethanol is being introduced into the reactor. The upper volume of hydrogen gas formed is based on the following reaction:

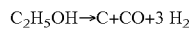

Thus, for example, up to 3 moles of hydrogen gas can form. When the flow rate of gaseous ethanol is 14 mL/min (liquid flow rate of ethanol of 0.05 mL/min), up to 50 L H$_2$/(h×g) catalyst can be obtained. The skilled practitioner will know how to adjust the ethanol flow rate to adjust the H$_2$ production to a desired level.

Reactor

Any suitable reactor known to the person of ordinary skill in the art can be used to practice the process of the present invention. For example, the reactor may be a fixed bed, a fluidized bed or a moving bed reactor.

The reactor may be horizontal or vertical. When the reactor is vertical, the feedstock (e.g., flow of gaseous ethanol) may be circulated by a down-flow mode or an up-flow mode. The skilled artisan will know how to select the type of reactor to perform the process of the invention. For example, a fixed bed may include a quench type reactor such as an internal multistage quench type, a multitubular type reactor, a multistage type reactor having a plurality of internal heat exchangers or the like, a multistage cooling radial flow type, a double pipe heat exchange type, an internal cooling coil type, a mixed flow type, and other types of reactors.

In certain exemplary embodiments, a horizontal catalyst-bed reactor such that schematized in FIG. 1 is used. It is to be understood that the dimensions of the reactor can be adapted to fit industrial scale production of hydrogen gas and carbon nanotubes.

Without wishing to be bound to any particular theory, we propose that a reactor like that shown in FIG. 1 allows to circumvent difficulties associated with over-pressure or clogging due to the deposit of coke.

Catalyst

The classical method for preparing metal supported catalysts consists in impregnating a support by an aqueous solution containing the metal precursor, followed by drying, calcination and reduction. However, in a catalyst resulting from this method, the metal particles (e.g., Ni particles) are deposited at the surface of the catalyst support. A catalyst support prepared by this classical method has therefore a lesser amount of metal particles (e.g., Ni particles) per gram of catalyst. In addition, this simple method does not readily allow the preparation of a catalyst having well-dispersed metal particles (e.g., Ni particles) of nanometer size.

Furthermore, an important drawback of commercially available catalysts, particularly lanthanum oxide-based catalysts, is that they exist as lanthanum oxycarbonates (i.e., the catalyst contains a certain amount of carbonate residues). The presence of these carbonates at the surface of the catalyst affects the basicity of the catalyst, and negatively impacts its reactivity.

Finally, it is well recognized that lanthanum oxide-based catalysts of high specific area, and stable at high temperatures, are difficult to prepare.

The use of a perovskite type catalyst precursor, LaNiO$_3$, overcomes the above-referenced disadvantages. It also allows the formation of carbon nanotubes with a much better yield than that observed when other types of catalysts are used.

Thus, in certain embodiments, the process is carried out over a catalyst prepared from a perovskite type catalyst precursor, LaNiO$_3$. In certain exemplary embodiments, the perovskite type catalyst precursor, LaNiO$_3$, is prepared by the so-called<<auto-ignition method>>[12]. The method is based on a very exothermic reaction during which the reaction medium is burnt over a brief period of time. After calcination at a suitable temperature, for a suitable amount of time, the catalyst precursor is obtained as a perovskite structure, free of carbon residues.

In certain exemplary embodiments, the calcination step is performed at a temperature ranging between 700 and 1000° C. In certain exemplary embodiments, the calcination step is performed at 700° C.

In certain exemplary embodiments, the calcination step is performed for 6 to 10 hours. In certain exemplary embodiments, the calcination step is performed for about 8 hours.

In certain embodiments, the Ni/La$_2$O$_3$ catalyst used to perform the process of the invention is produced in situ in the reactor by subjecting the perovskite type catalyst precursor, LaNiO$_3$, to a hydrogenation step under suitable temperatures, for a suitable amount of time, prior to contacting the gaseous ethanol with the catalyst. In certain exemplary embodiments, the hydrogenation step is performed at a temperature ranging between 500 and 900° C., between 600 and 800° C. In certain exemplary embodiments, the hydrogenation step is performed at 700° C.

In certain exemplary embodiments, the hydrogenation step is performed for 0.5 to 2 hours. In certain exemplary embodiments, the hydrogenation step is performed for about 1 hour.

In certain embodiments, the Ni % wt in the final catalyst can be controlled by varying the amounts of Ni and La starting materials in the preparation of the perovskite LaNiO$_3$ catalyst precursor. For example, the catalyst precursor can be prepared from mixing Ni nitrate (Ni(NO$_3$)$_2$, 6H$_2$O) and La nitrate (La(NO$_3$)$_3$, 6H$_2$O) in an aqueous solution. In certain embodiments, the aqueous solution also contains glycine. As the skilled person in the art will appreciate, using varying amount of Ni and La nitrates will lead to catalysts having varying contents in Ni particles. The skilled artisan will know how to vary the amounts of Ni and La nitrate starting materials to obtain a Ni/La$_2$O$_3$ catalyst of desired specificity. In certain embodiments, the Ni % wt in the final catalyst ranges from between 5 and 24%.

The Ni % wt in the final catalyst can have an impact on the internal diameter of the carbon nanotubes obtained by the process.

In particular, the % Ni content can affect the Ni particle size distribution in the catalyst. Without wishing to be bound by any particular theory, we base our analysis on the proposition that small metal particles easily congregate to form larger particles. Thus, by increasing the % Ni content, we hypothesize that the Ni particle size distribution is shifted to larger particle size (because the Ni particles are in closer proximity, and are thus more amenable to aggregating with one another). As the Ni particle size increases, so does the internal diameter of the carbon nanotube internal diameter. Accordingly, adjusting the Ni % wt in the final catalyst allows to have some control over the carbon nanotube size, particularly the internal diameter.

In certain embodiments, the Ni particles in the Ni/La$_2$O$_3$ catalyst range in size from 1 to 60 nm, from 1 to 50 nm, from 1 to 40 nm, from 1 to 30 nm, from 1 to 25 nm, from 1 to 20 nm, from 1 to 15 nm, from 1 to 10 nm. In certain embodiments, the Ni particles in the Ni/La$_2$O$_3$ catalyst range in size from 2 to 10 nm.

The diameter of carbon nanotubes produced by the process of the present invention in turn depends on the metal particle size of the catalyst. Carbon nanotubes of small and uniform diameter size present a greater interest in the industry. Accordingly, in certain exemplary embodiments, the process of the present invention is carried out with a Ni/La$_2$O$_3$ catalyst having a % Ni wt content not exceeding 24%.

In certain embodiments, the % Ni wt content in the Ni/La$_2$O$_3$ catalyst used in the present invention ranges between 5 and 24%. In certain exemplary embodiments, the % Ni wt content in the Ni/La$_2$O$_3$ catalyst ranges between 5 and 24%, between 7 and 24%, between 9 and 24%, between 11 and 24%, between 13 and 24%, between 15 and 24%, between 17 and 24%, between 19 and 24%. In certain exemplary embodiments, the % Ni wt content in the Ni/La$_2$O$_3$ catalyst ranges between 15 and 24%.

As the amount of Ni in the catalyst decreases, the diameter of the formed nanotubes also decreases. Hence, the diameter of nanotubes can be controlled by varying the amount of Ni in the catalyst. As the Ni content is decreased, the yield of nanotubes also decreases, so a balance must be sought between the carbon nanotube diameter and yield. The diameter of carbon nanotubes can easily be ascertain through TEM. Thus, the skilled artisan will know how to vary the Ni % wt in the Ni/La$_2$O$_3$ catalyst to obtain carbon nanotubes of desired specificity, and with an acceptable yield, without undue experimentation.

In certain embodiments, the Ni/La$_2$O$_3$ catalyst has a specific area equal to or greater than 5 m$^2$/g of catalyst. In certain embodiments, the Ni/La$_2$O$_3$ catalyst has a specific area ranging between 5 and 15 m$^2$/g of catalyst.

In certain embodiments, the Ni/La$_2$O$_3$ catalyst has a reactivity 5 to 10 times higher than other known or commercial nickel catalysts over lanthanum oxide support.

Carbon Nanotubes

According to the process of the present invention, carbon nanotubes form on the Ni particles of the catalyst. Accordingly, in certain embodiments, the process comprises a step of separating the carbon nanotubes from the catalyst on which they formed. In certain exemplary embodiments, the carbon nanotubes are isolated by acidic treatment of the raw mixture comprising the catalyst particles and the carbon nanotubes. For example, inorganic acids such as HNO$_3$, H$_2$SO$_4$, HCl, HClO$_3$ and/or HClO$_4$ may be used to effect separation of the carbon nanotubes from the catalyst.

In certain exemplary embodiments, the separation step is effected by stirring the raw mixture of catalyst and carbon nanotubes in nitric acid, followed by filtering the resulting mixture and drying the carbon nanotubes obtained.

In certain exemplary embodiments, after the acidic treatment, the carbon nanotubes are subjected to a purifying step. In certain exemplary embodiments, the purifying step comprises stirring the carbon nanotubes in a solution of H$_2$O$_2$, followed by filtering the resulting mixture and drying the carbon nanotubes obtained. In certain other exemplary embodiments, the carbon nanotubes are stirred in a solution of H$_2$O$_2$ for about 1 hour. In certain exemplary embodiments, the H$_2$O$_2$ solution is a 10% H$_2$O$_2$ solution.

The internal diameter of the carbon nanotubes prepared by the process of the present invention correlates with the Ni particle size of the Ni/La$_2$O$_3$ catalyst. It is also possible to direct the growth of the carbon nanotubes in a particular direction by preparing them on a catalyst support of predefined geometry.

In certain embodiments, the carbon nanotubes' internal diameter ranges between 2 and 20 nm, between 5 and 20 nm, between 2 and 15 nm. In certain exemplary embodiments, the carbon nanotubes' internal diameter ranges between 6 and 20 nm.

In certain embodiments, the nanotubes' external diameter ranges between 6 and 45 nm, between 10 and 45 nm, between 15 and 45 nm, between 20 and 40 nm.

In certain embodiments, the carbon nanotubes are multi-walled carbon nanotubes, single-walled carbon nanotubes, or a mixture thereof. In certain exemplary embodiments, the carbon nanotubes are primarily multi-walled carbon nanotubes.

In certain embodiments, the amount of carbon nanotubes obtained by the process of the present invention is equal to or greater than 15 g per gram of catalyst. In certain exemplary embodiments, the amount of carbon nanotubes obtained by the process of the present invention is between 15 and 20 g of carbon nanotubes per gram of catalyst. In certain other exemplary embodiments, the process is carried out at a temperature ranging from 400 to 500° C., and the amount of carbon nanotubes obtained is between 15 and 20 g of carbon nanotubes per gram of catalyst. In certain other exemplary embodiments, the process is carried out at about 500° C., and the amount of carbon nanotubes obtained is between 15 and 20 g of carbon nanotubes per gram of catalyst.

Hydrogen Gas

In certain embodiments, the hydrogen gas produced by the process is isolated by standard methods, for example those using membrane technology or cryogenic systems. In certain other embodiments, the hydrogen gas produced by the process is isolated by selective adsorption process, or by transforming the CO that co-elutes to CO$_2$ by water gas shift reaction.

It will be appreciated that the gas mixture that elutes from the reactor (H$_2$+CO+N$_2$) finds industrial applications as is (i.e., without purification steps of the co-eluting gases), for example in the production of ammonia and urea.

In certain embodiments, the amount hydrogen gas obtained by the process of the present invention is equal to or greater than 17 L/h H$_2$ per gram of catalyst. In certain exemplary embodiments, the amount of hydrogen gas obtained by the process of the present invention is between 19 and 40 L/h H$_2$ per gram of catalyst.

In certain exemplary embodiments, the amount of hydrogen gas obtained by the process of the present invention is between 19 and 21 L/h H$_2$ per gram of catalyst. In certain other exemplary embodiments, the process is carried out at a temperature ranging from 400 to 500° C., and the amount of hydrogen gas obtained is between 19 and 40 L/h H$_2$ per gram of catalyst. In certain other exemplary embodiments, the process is carried out at about 500° C., and the amount of hydrogen gas obtained is between 19 and 40 L/h H$_2$ per gram of catalyst.

In another aspect, the invention provides the use of a Ni/La$_2$O$_3$ catalyst obtainable by H$_2$ reduction of a LaNiO$_3$ perovskite catalyst precursor in the manufacture of hydrogen gas and carbon nanotubes from gaseous ethanol.

In summary, the present invention allows the economic production of multi-walled and/or single-walled carbon nanotubes with uniform diameter distribution, on a large scale, coupled with the simultaneous production of hydrogen gas, from a renewable fuel such as bioethanol. The process has therefore a great potential in a wide range of industrial applications.

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXAMPLES

The process of this invention and its various modes of reduction to practice can be understood further by the examples that illustrate some of the modes by which the process is practiced. It will be appreciated, however, that these examples do not limit the invention. Variations of the invention, now known or further developed, are considered to fall within the scope of the present invention as described herein and as hereinafter claimed.

Example 1

Preparation of LaNiO$_3$ Perovskite Catalyst Precursor

The perovskite type oxide LaNiO$_3$ was prepared by the so-called <<auto-ignition method.>> The method is based on a very exothermic reaction during which the reaction medium is burnt over a brief period of time. This method allows the preparation of a catalyst having good chemical homogeneity, and small particle size.

6.5 gram of Ni nitrate (Ni(NO$_3$)$_2$, 6H$_2$O), 4.36 gram of La nitrate (La(NO$_3$)$_3$, 6H$_2$O), and 5.63 gram of Glycine (H$_2$NCH$_2$CO$_2$H), were dissolved in a minimal amount of water, so that the ratio of chemical entities NO$_3^-$/NH$_2$ was 1.

The resulting solution was slowly evaporated until a vitreous material formed (gel), which was then heated to its auto-ignition point (200-250° C.). Combustion of the gel lead to the formation of a fine powder, which was the precursor of the perovskite material. Calcination under air (flow rate: 200 mL/min) for 8 hours at 700° C. lead to the formation of the perovskite structure, and allowed the elimination of all carbonaceous species present in the powder material. The process yielded 6 gram of LaNiO$_3$ perovskite catalyst precursor with an Ni content=24 wt %.

Example 2

Figure 1:
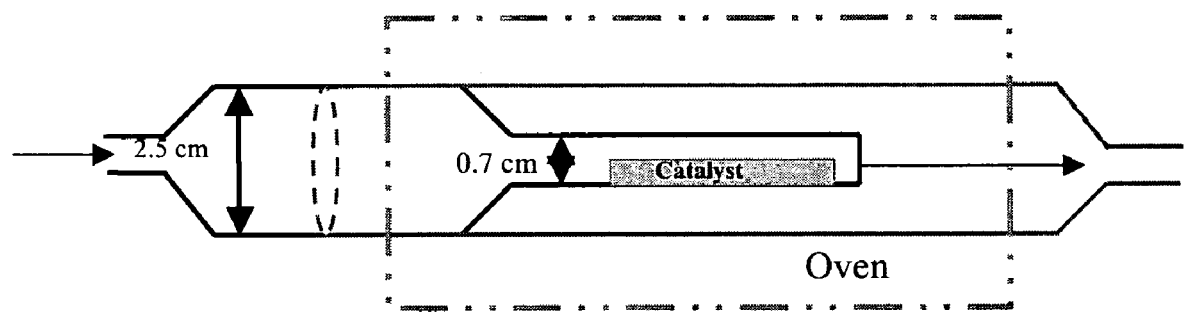
FIG. 1 shows a partial-schematic representation of a reactor suitable for implementing the process of the invention.
Figure 2:
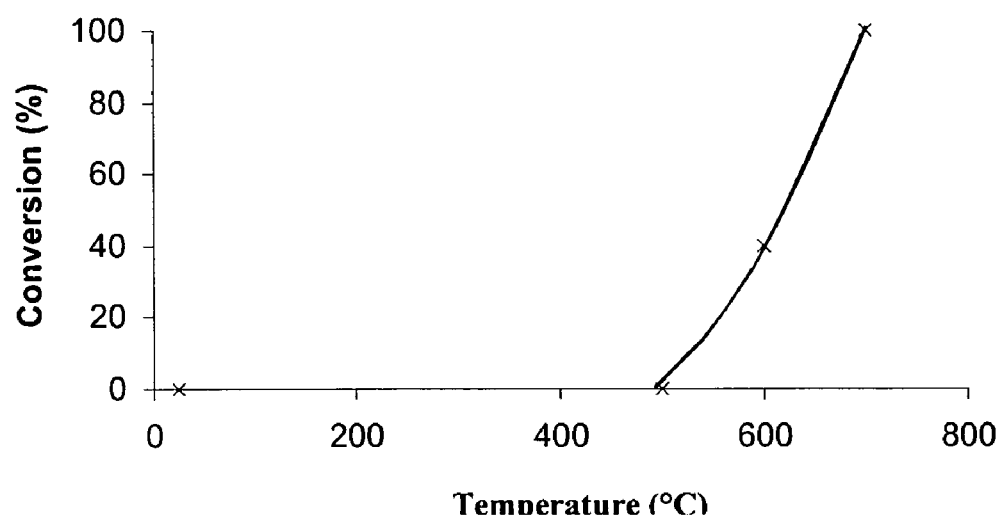
FIG. 2 is a graph showing the stability of ethanol as a function of temperature.
Figure 3:
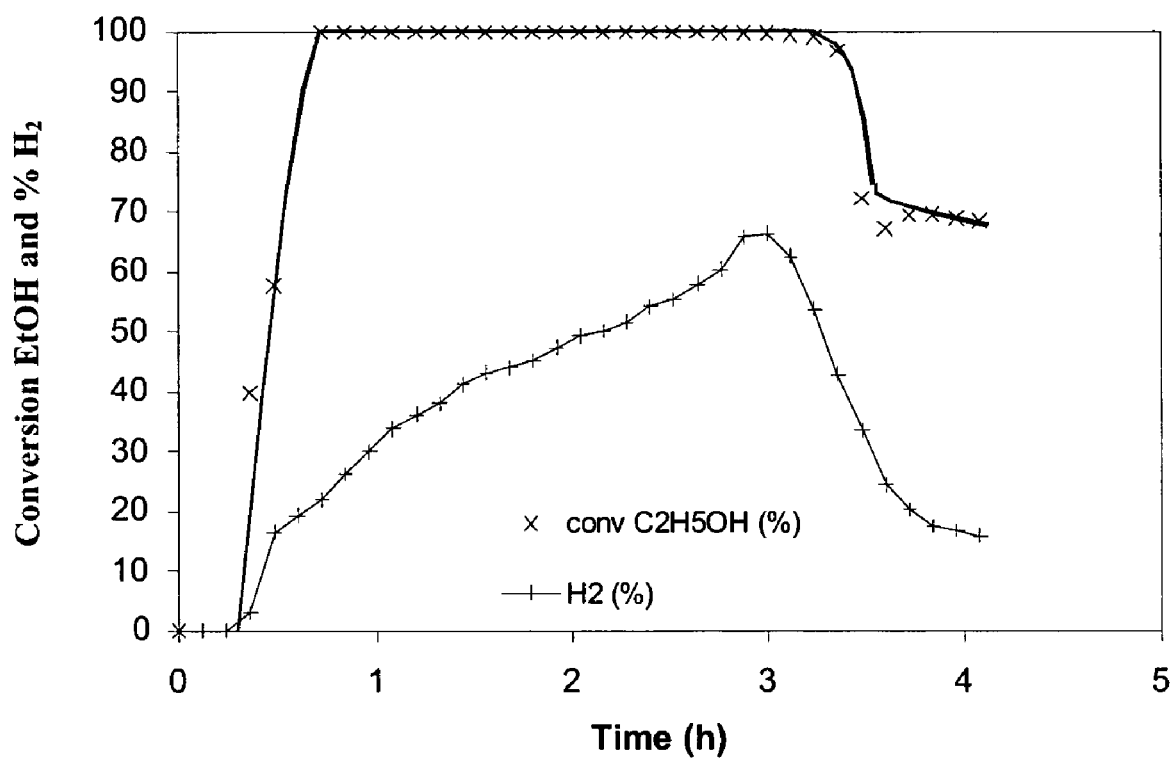
FIG. 3 is a graph showing a catalytic decomposition of ethanol (x) and the production of hydrogen gas (+) as a function of time by the process of the invention. The process was carried out at 500° C. over reduced perovskite catalyst Ni/La$_2$O$_3$.

In situ Formation of Reduced Perovskite Ni/La$_2$O$_3$ Catalyst 50 mg of the LaNiO$_3$ perovskite catalyst precursor obtained in Example 1 was spread as a thin layer in the reaction chamber of the reactor shown in FIG. 1. The perovskite material was reduced with H$_2$ at 700° C. for one hour prior to starting the process of ethanol catalytic decomposition. After reduction, the catalyst, Ni/La$_2$O$_3$, consists of small Ni particles and lanthanum oxide. The absence of lanthanum oxycarbonate (La$_2$O$_2$CO$_3$) was confirmed by XRD analysis. The size distribution of the Ni particles was determined by TEM analysis. The Ni particles range in size between 5 and 30 nm.

Example 3

Process Conducted at 500° C.—Catalytic Decomposition of Ethanol

After H$_2$ reduction of the LaNiO$_3$ perovskite catalyst precursor according to Example 2, the reactor was cooled to room temperature. Absolute ethanol (99.9%) was then introduced via a dosimeter at a liquid flow rate of 0.05 mL/min into a chamber heated at 200° C., so as to cause transition of the ethanol into a gaseous state. The gaseous ethanol was carried into the reactor chamber heated at 500° C., and containing the catalyst bed, with nitrogen gas at a flow rate of 20 mL/min. The catalytic decomposition of ethanol was carried out at 500° C. for 4 hours. The carbon nanotubes were separated from the catalyst by acidic treatment as follows: 0.2 to 0.8 g of a raw solid containing the catalyst and the carbon nanotubes was immersed into 20 mL of 65% nitric acid so as to dissolve the catalyst particles present at the extremities of the carbon nanotubes. The resulting mixture was stirred for 1 hour, and then was filtered. The resulting carbon nanotubes were then stirred for one hour in a 10% solution of H$_2$O$_2$, and filtered. The carbon nanotubes were dried in an oven at 100° C. for 12 hours, to yield 800 mg of carbon nanotubes (i.e., 15.8 g of carbon nanotubes/g of catalyst). In addition, 3.4 L of hydrogen gas (i.e., 19.5 L H$_2$/h/g of catalyst) were obtained.

The amount of H$_2$ produced was determined by mass spectrometry and gas chromatography.

Example 4

Process Conducted at 500° C.—Catalytic Decomposition of Ethanol

Another batch conducted in the same reaction conditions as Example 3 above yielded 880 mg of carbon nanotubes (i.e., 17.6 g of carbon nanotubes/g of catalyst) and 3.5 L of hydrogen gas (i.e., 20.3 L H$_2$/h/g of catalyst).

Example 5

Process Conducted at 700° C.—Thermal Decomposition of Ethanol

After $H_2$ reduction of the $LaNiO_3$ perovskite catalyst precursor according to Example 2, the reactor was cooled to room temperature. Absolute ethanol (99.9%) was then introduced via a dosimeter at a flow rate of 0.05 mL/min into a chamber heated at 200° C., so as to cause transition of the ethanol into a gaseous state. The gaseous ethanol was carried into the reactor chamber heated at 700° C., and containing the catalyst bed, with nitrogen gas at a flow rate of 20 mL/min. The catalytic decomposition of ethanol was carried out at 700° C. for 4 hours. The carbon nanotubes were isolated according to the purification procedure described in Example 3 ($HNO_3$ treatment) to yield 185 mg of carbon nanotubes (i.e., 3.7 g of carbon nanotubes/g of catalyst). In addition, 2.9 L of hydrogen gas were obtained (i.e., 16.8 L $H_2$/h/g of catalyst).

Example 6

Process Conducted at 700° C.—Thermal Decomposition of Ethanol

Another batch conducted in the same reaction conditions as Example 5 above, with the exception that the reaction time was 12 hours instead of 4, yielded 270 mg of carbon nanotubes (i.e., 5.4 g of carbon nanotubes/g of catalyst) and 6.8 L of hydrogen gas (i.e., 13.6 L $H_2$/h/g of catalyst).

The results of Examples 3-6 are summarized in Table 1 below. The transformation of ethanol, and the production of hydrogen gas were monitored with a mass spectrometer operated with QuadStar software. The mass ions that were analyzed were m/z 2, 15, 28, 31 and 44, which corresponds to $H_2$, $CH_4$, CO, $C_2H_5OH$ and $CO_2$, respectively. The formation of C2-hydrocarbons was monitored at m/z 27 and 30.

$$C_2H_5OH \rightarrow CH_4 + CO + H_2 \quad \text{(Reaction 2)}$$

$$CH_4 + CO_2 \rightarrow 2\,CO + 2\,H_2 \quad \text{(Reaction 3)}$$

Example 7

Characterization of the Carbon Nanotubes

Figure 4A:
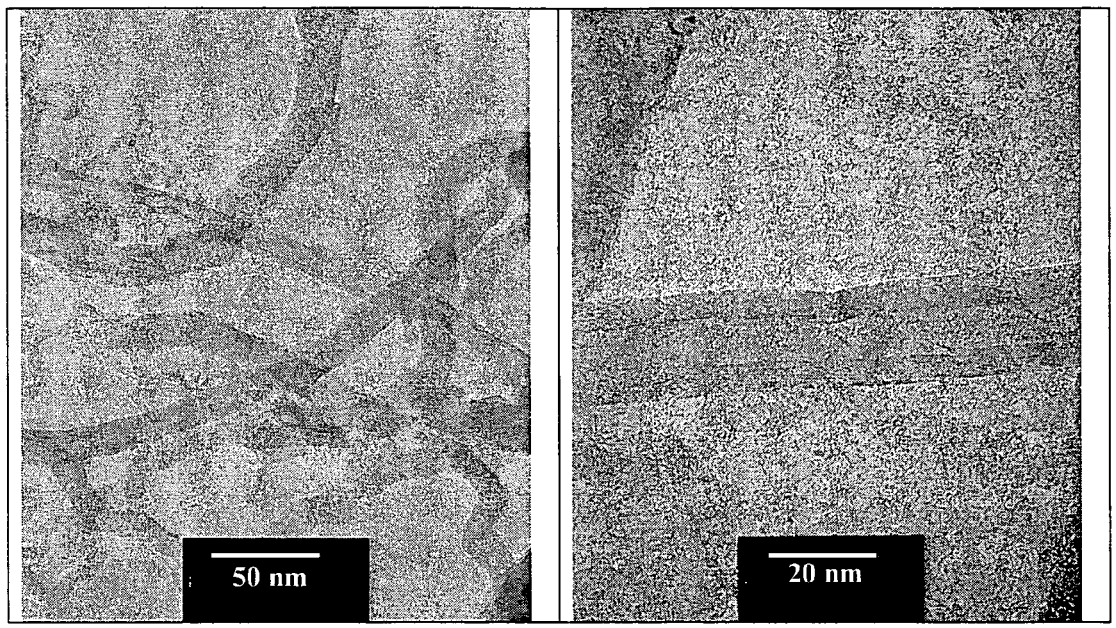
FIG. 4 shows a transmission electron microscopy (TEM) micrograph of carbon nanotubes obtained by catalytic decomposition of ethanol over reduced perovskite catalyst Ni/La$_2$O$_3$ at 500° C. for 4 hours (FIG. 4A) and 700° C. for 4 hours (FIG. 4B). The reaction was conducted with a 0.05 mL/min flow of ethanol, and 50 mg of reduced perovskite catalyst precursor.
Figure 4B:
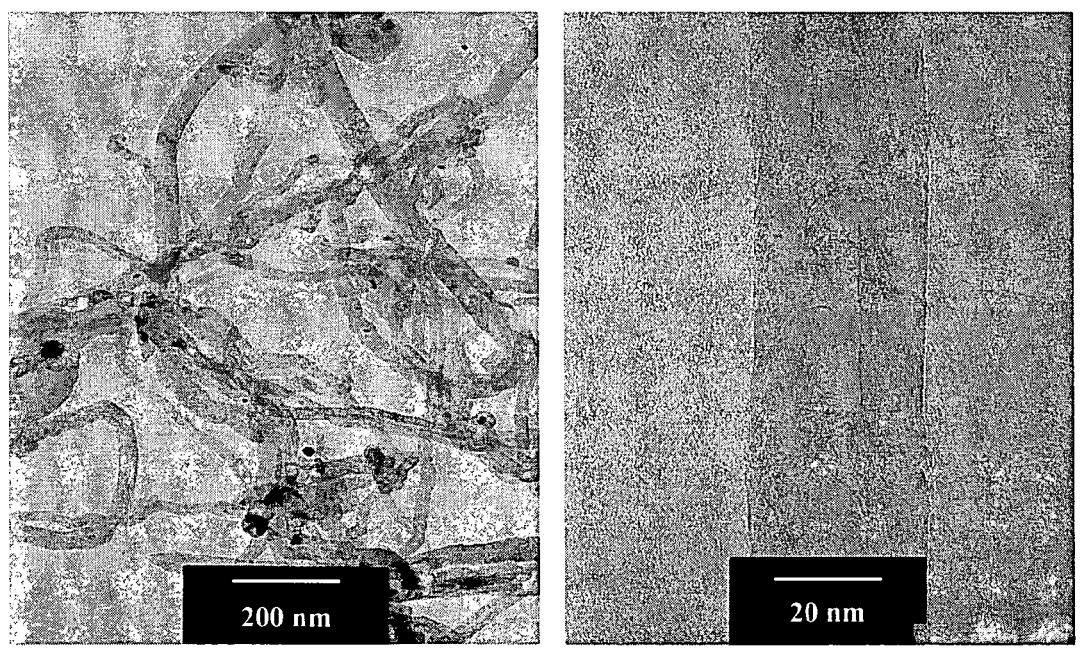

The carbon nanotubes were characterized by TEM. The micrographs shown in FIG. 4 were taken on carbon nanotubes obtained after 4 hours of reaction at 500° C. (FIG. 4A) and 700° C. (FIG. 4B), and after acidic treatment to separate them from the catalyst. As shown on FIG. 4, the carbon nanotubes obtained were multi-wall carbon nanotubes. In addition, the carbon nanotubes were <<curved>> and had an external diameter ranging from 20 to 40 nm. The internal diameter of these carbon nanotubes corresponded to the diameter of the catalyst nickel particles, and ranged from 6 to 20 nm.

Figure 5:
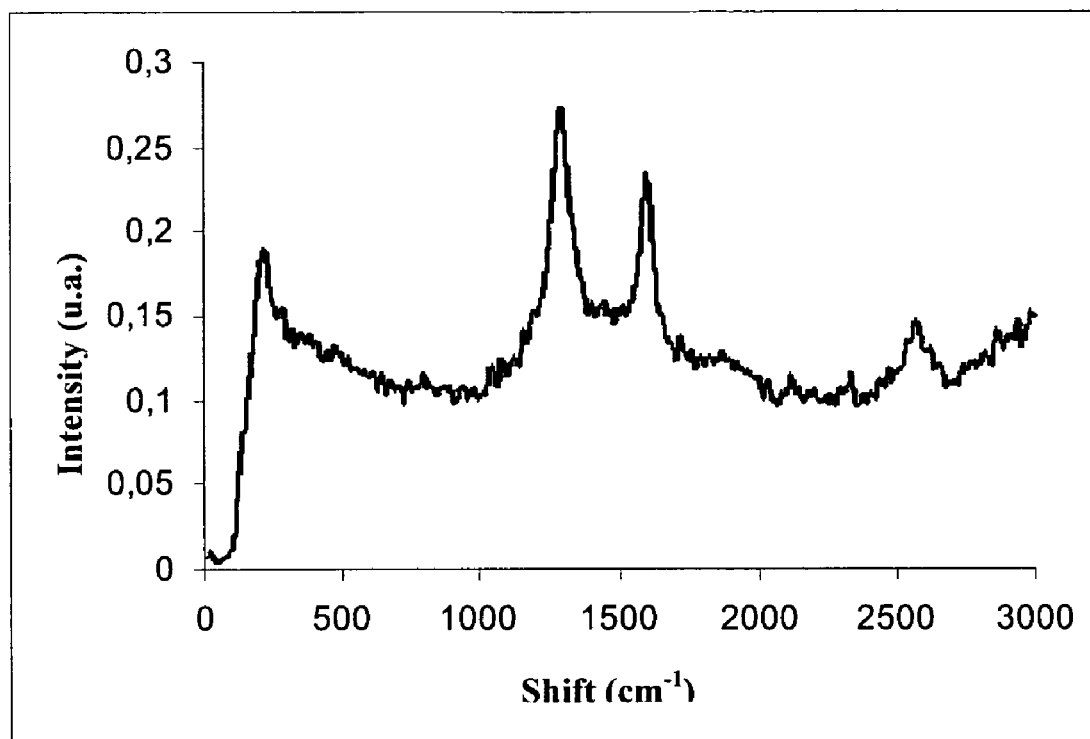
FIG. 5 shows a Raman spectrum of carbon nanotubes obtained by catalytic decomposition of ethanol over reduced perovskite catalyst Ni/La$_2$O$_3$ at 700° C. for 4 h hours. The reaction was conducted with a 0.05 mL/min flow of ethanol, and 50 mg of reduced perovskite catalyst precursor.

The carbon nanotubes were also characterized by raman spectrometry. FIG. 5 shows the presence of two narrow peaks at 1290 cm$^{-1}$ (D band) and 1602 cm$^{-1}$ (G band), and a broader peak at 2568 cm$^{-1}$ (2D or D* band). The spectrum shown in FIG. 5 is characteristic of the presence of multi-wall carbon nanotubes. However, the peak at 200 cm$^{-1}$ reveals the presence of single-wall carbon nanotubes. The ratio ID/IG (ratio of the intensities of D and G bands), which equals 1.15, indicates that the carbon nanotubes are well organized, this ratio being comparable to that obtained for carbon nanotubes resulting from catalytic decomposition of methane. In summary, the carbon nanotubes prepared from ethanol according to the process of the present invention have similar properties to those obtained from methane.

Figure 6:
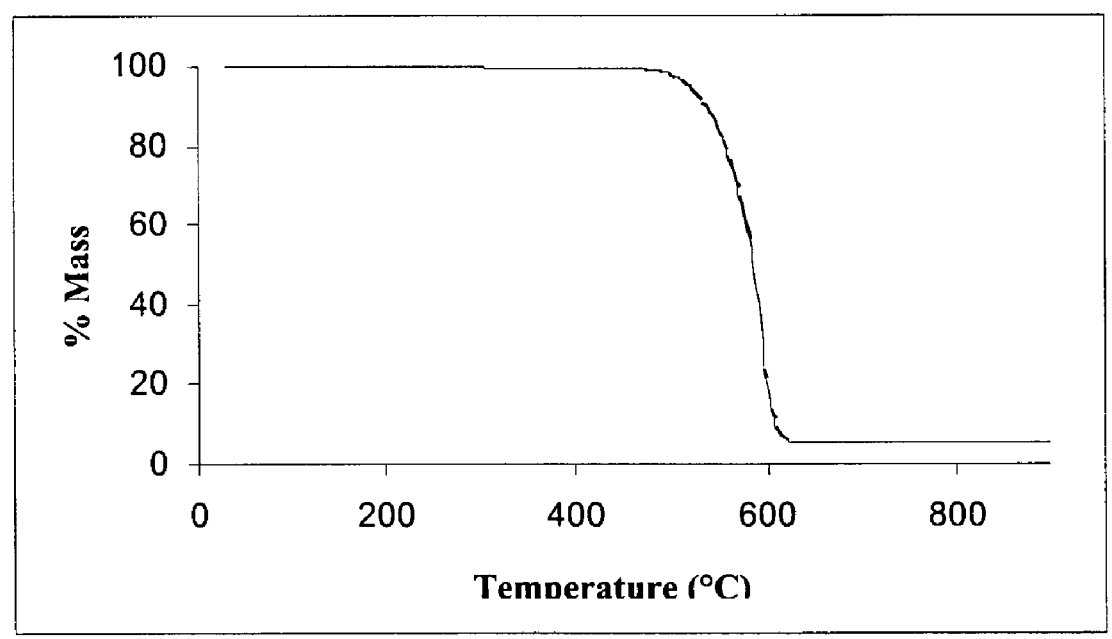
FIG. 6 shows a thermogravimetric analysis (TGA) graph of a carbon nanotube sample obtained by catalytic decomposition of ethanol over reduced perovskite catalyst Ni/La$_2$O$_3$ at 500 and 700° C. ° C. for 4 h hours. The reaction was conducted with a 0.05 mL/min flow of ethanol, and 50 mg of reduced perovskite catalyst precursor.

As shown in FIG. 6, TGA analysis indicated that the carbon nanotubes have a high thermal stability. Indeed, the carbon nanotubes only start undergoing thermal decomposition between 500 and 630° C.

TABLE 1

| Conditions of reactions | | | | Products of reaction | | | |
|---|---|---|---|---|---|---|---|
| | | | | | Yield of carbon nanotubes | | Yield of hydrogen |
| Temperature (° C.) | Total flow | Ethanol flow % | mL/min | mg | mg/h | L/(h*$g_{catalyst}$) | $\dfrac{L_{H_2}}{L_{EtOH} * g_{catalyst}}$ |
| 500 | 50 | 50 | 25 | 710 | 178 | 35 | 23.3 |
| 700 | 25 | 2.6 | 0.65 | 340 | 8 | 34.1 | 874.4 |
| 700 | 25 | 5 | 1.25 | 416 | 17 | 36.5 | 486.7 |
| 700 | 10 | 50 | 5 | 270 | 68 | 14.8 | 49.3 |
| 700 | 50 | 50 | 25 | 660 | 165 | 39.08 | 26.1 |

The quantities of carbon nanotubes listed in Table 1 correspond to the amount of carbon nanotubes obtained after elimination of the catalyst from the raw carbon nanotubes by acidic treatment.

As seen in Table 1, the production of carbon nanotubes is favored at 500° C. (over 15 g of carbon nanotubes is obtained per gram of catalyst). When the reaction is performed at 700° C., carbon nanotubes are obtained in lesser amounts. However, the amount of hydrogen gas produced remains substantially the same. As discussed above, at that temperature, thermal decomposition of ethanol is nearly complete, and hydrogen gas can be obtained either directly (reaction 2) or indirectly by $CO_2$ reforming of methane (reaction 3), $CO_2$ and methane being the thermal decomposition products of ethanol.

Comparative Example 1

$La_2O_3$ was prepared by the self-combustion method and impregnated with $Ni(NO_3)$ at 5% ($^w/_w$) then calcined at 700° C. Absolute ethanol (99.9%) was then introduced into the reactor via a dosimeter at a liquid flow rate of 0.05 mL/min. The gaseous ethanol was carried into the reactor chamber heated at 700° C., and containing the catalyst bed (50 mg of catalyst), with helium gas at a flow rate of 25 mL/min. The catalytic decomposition of ethanol was carried out at 700° C. for 4 hours. The carbon nanotubes were separated from the catalyst by acidic treatment, purified and dried to give 190 mg of carbon nanotubes (i.e., 3.8 g of carbon nanotubes/g of catalyst). In addition, 19.0 L $H_2$/h/g of catalyst were obtained.

The above results clearly show that there is a marked difference in the results depending to the catalyst preparation method (impregnation versus reduced prerovskite precursor). Without wishing to be bound by any particular theory, we propose that the unexpected higher yields in $H_2$ and carbon nanotubes obtained by the process of the present Application over other conventional methods reported in the literature, may be due at least in part to the smaller Ni particle size and better Ni particle distribution on the catalyst support.

While we have described a number of embodiments of this invention, it is apparent that our basic examples may be altered to provide other embodiments that utilize the compounds and methods of this invention. Therefore, it will be appreciated that the scope of this invention is to be defined by the appended claims rather than by the specific embodiments that have been represented by way of example.

REFERENCES

[1] Planeix et al., *J. Am. Chem. Soc.*, 1994, 116:7935-7936
[2] Ajayan et al., *Nature*, 1993, 362:522-525
[3] Treacy et al., *Nature*, 1996, 381:678-680
[4] Iijima, *Nature*, 1991, 354:56-58
[5] Saito et al., *Chem. Phys. Lett.*, 1995, 236:419-426
[6] Muradov et al., *Int. J. Hydrogen Energy*, 1993, 18:211-215
[7] Ishihara et al., *Chem. Lett.*, 1995, 2:93-94
[8] Rostrup-Nielsen, Catal. Today, 2005, 106:293-296
[9] Basini et al., Catal. Today, 2005, 106:34-40
[10] US Patent Application No. 2003/0129122
[11] U.S. Pat. No. 6,315,977
[12] U.S. Pat. No. 3,330,697

The invention claimed is:

1. A process of manufacture of hydrogen gas and carbon nanotubes from gaseous ethanol comprising contacting the ethanol with a $Ni/La_2O_3$ catalyst obtained by $H_2$ reduction of a $LaNiO_3$ perovskite catalyst precursor,
wherein the Ni particles in the $Ni/La_2O_3$ catalyst range in size from 5 to 30 nm, and the $Ni/La_2O_3$ catalyst has a specific area equal to or greater than 5 $m^2/g$, and
wherein the rate of production of hydrogen gas is equal to or greater than 10 L/h of $H_2$ per gram of catalyst.

2. A process for producing hydrogen gas and carbon nanotubes comprising:
contacting gaseous ethanol with a $Ni/La_2O_3$ catalyst such that hydrogen gas and carbon nanotubes are produced concurrently with carbon monoxide,
wherein the $Ni/La_2O_3$ catalyst is obtained by $H_2$ reduction of a $LaNiO_3$ perovskite catalyst precursor, the Ni particles in the $Ni/La_2O_3$ catalyst range in size from 5 to 30 nm, and the $Ni/La_2O_3$ catalyst has a specific area equal to or greater than 5 $m^2/g$,
wherein the process for producing hydrogen gas and carbon nanotubes is conducted at a temperature ranging from 300° C. to 900° C., and
wherein the rate of production of hydrogen gas is equal to or greater than 10 L/h of $H_2$ per gram of catalyst.

3. The process of claim 2, wherein the process is conducted at a temperature ranging from 400° C. to 500° C.

4. The process of claim 2, wherein the gaseous ethanol is mixed with a carrier inert gas in a ratio of gaseous ethanol/carrier inert gas ranging from 20/80 to 80/20 by volume.

5. The process of claim 2, wherein the ethanol is produced from biomass which contains sugar and/or cellulosic components.

6. The process of claim 2 wherein the carbon nanotubes are collected by acidic treatment of the mixture of catalyst and carbon nanotubes.

7. The process of claim 2 wherein the carbon nanotubes are multi-walled nanotubes.

8. The process of claim 2 wherein the carbon nanotubes' internal diameter ranges from 6 to 20 nm, and the nanotubes external diameter ranges from 20 and 40 nm.

9. The process of claim 2 wherein the amount of carbon nanotubes obtained is equal to or greater than 15 g per gram of catalyst.

10. The process of claim 2 wherein the process is carried out in a horizontal catalyst-bed reactor.

11. The process of claim 2 wherein the amount of carbon nanotubes obtained is equal to or greater than 6 g per gram of catalyst.

* * * * *